United States Patent [19]
Miyoshi

[11] Patent Number: 5,967,464
[45] Date of Patent: Oct. 19, 1999

[54] OBJECT-TRANSPORTING APPARATUS AND METHOD FOR TRANSPORTING OBJECT

[75] Inventor: Hiroaki Miyoshi, Tokyo, Japan

[73] Assignee: NEC Corporation, Tokyo, Japan

[21] Appl. No.: 08/840,165

[22] Filed: Apr. 14, 1997

[30] Foreign Application Priority Data

Apr. 13, 1996 [JP] Japan ................................. 8-115791

[51] Int. Cl.[6] .................................................. B64G 4/00
[52] U.S. Cl. .................... 244/158 R; 244/161; 244/137.1
[58] Field of Search ............................ 244/158 R, 161, 244/137.1; 198/699.1

[56] References Cited

U.S. PATENT DOCUMENTS

| | | | |
|---|---|---|---|
| H1378 | 11/1994 | Crane et al. ........................... | 244/161 |
| 3,253,692 | 5/1966 | Ota ........................................ | 198/699.1 |
| 3,658,170 | 4/1972 | Wilson .................................. | 198/699.1 |
| 4,619,023 | 10/1986 | Tsubokawa ............................ | 24/394 |
| 5,457,855 | 10/1995 | Kenney et al. ........................ | 24/445 |

FOREIGN PATENT DOCUMENTS

| | | |
|---|---|---|
| 50-8392 | 3/1975 | Japan . |
| 53-7500 | 2/1978 | Japan . |
| 62-29225 | 2/1987 | Japan . |
| 1-128499 | 9/1989 | Japan . |

*Primary Examiner*—Charles T. Jordan
*Assistant Examiner*—Charles R Ducker, Jr.
*Attorney, Agent, or Firm*—Young & Thompson

[57] ABSTRACT

An object-transporting apparatus and method is provided for moving an object in a zero-gravity environment without the use of a latch handle or sprayed pressurized air. The object to be transported includes a first joinable element which mates with a second joinable element attached to a transport means such as a slide table, which is moved by a transport mechanism, using the mated joinable elements.

6 Claims, 3 Drawing Sheets

OBJECT-TRANSPORTING APPARATUS AND METHOD FOR TRANSPORTING OBJECT

BACKGROUND OF THE INVENTION

1. Field of the Invention

The present invention relates to an object-transporting apparatus for use in a zero-gravity space, and more specifically to an apparatus for the purpose of transporting materials in a space station.

2. Description of Related Art

With regard to transporting objects on the earth and under the effect of normal gravity, an object-transporting apparatus such as a conveyor belt can be used to transport an object thereon, making use of the frictional force developed by virtue of the gravitation force.

However, in a zero-gravity environment, such as in outer space, it is not possible to make use of a frictional force generated by virtue of gravity.

Therefore, a different type of transporting apparatus must be considered for use in a zero-gravity environment.

In the past, a proposal was made to provide a latch handle on a slide table so as to enable the holding of an object of a standardized shape. There also has been proposed a method of holding an object by means of a spray of air pressure, as disclosed in the Japanese Utility Model application S63-25734.

However, in the above-noted prior art, the following problem arises. Specifically, in the case of grabbing and holding a transported object using a latch handle, it is necessary to provide an electromechanical apparatus such as an actuator driver or the like to drive the latch handle, the latch handle itself being large, the result being not only an increase in weight and bulk, but also an increase in electrical power consumption.

In addition, in grabbing a transported object with a latch handle, because an object of a standardized size is to be grabbed, application to non-standard objects is not possible, thereby making the system inflexible.

Further, in the case of grabbing and holding a transported object using a latch handle, there must exist mechanical moving parts in the apparatus and thus malfunctions thereof would likely occur. Thus, this kind of transporting apparatus or method would likely have low reliability in an outer space from a point of view of correct and accurated operation thereof.

Also, in the case of holding an object using the force of sprayed air, the transport of the object is limited to the location of the air pressure, so that such a use is only possible only in a space wherein air pressure can be applied.

In spraying and circulating the air, it is necessary to have a fan or ventilation equipment, thereby leading to an increase in the scale of the equipment.

In view of the above-noted drawbacks in the prior art, an object of the present invention is to provide an apparatus and a method for transporting an object without using a latch handle, and without using sprayed pressurized air.

SUMMARY OF THE INVENTION

To achieve the above-noted object, the present invention comprises the following elements.

In a first aspect of the present invention, an object-transporting apparatus for transporting an object in a zero-gravity environment comprises a transport mechanism including a first joining element mounted on at least a portion of the transport mechanism; a second joining element, being capable of coupling with the first joining element, mounted on at least a portion of the object to be transported, so that the object can be transported by coupling or mating the first and second joining elements together.

In a second aspect of the present invention, a method for transporting an object in a zero-gravity environment comprises the steps of: providing a first joining element on at least a portion of a transport mechanism; providing a second joining element, being capable of coupling with the first joining element, on at least a portion of the object to be transported; coupling the first and second joining elements to mate together so that the object to be transported is fixedly mounted on the transporting mechanism; and moving the transport mechanism by a suitable driving means.

In accordance with one embodiment of the object-transporting apparatus of the present invention, the transportation of an object is provided by means of a slide table which moves by a transport mechanism in a zero-gravity environment, the slide table having mounted to it a joining element, the object to be transported also having mounted to it a joining element, these joining elements being joined together.

Therefore, it is possible to hold an object to be moved in place by means of the joining elements attached to each of the slide table and the object to be transported. This configuration provides sufficient holding of the object to be transported by slide table, due to the frictional force in the joining elements, without using either a latch handle or air pressure as required in the past.

BRIEF DESCRIPTION OF THE DRAWINGS

FIG. 1(A) shows a side schematic view of the apparatus of the present invention. FIG. 1(B) shows a plane view especially illustrating a main part of the object-transporting apparatus of the present invention. FIG. 1(C) shows a schematic view of the present invention illustrating how the object to be transported can be fixedly mounted on the transport mechanism.

DETAILED DESCRIPTION OF THE INVENTION

An embodiment of the present invention is described below, with reference being made to FIG. 1 through FIG. 4.

Figure 1A:
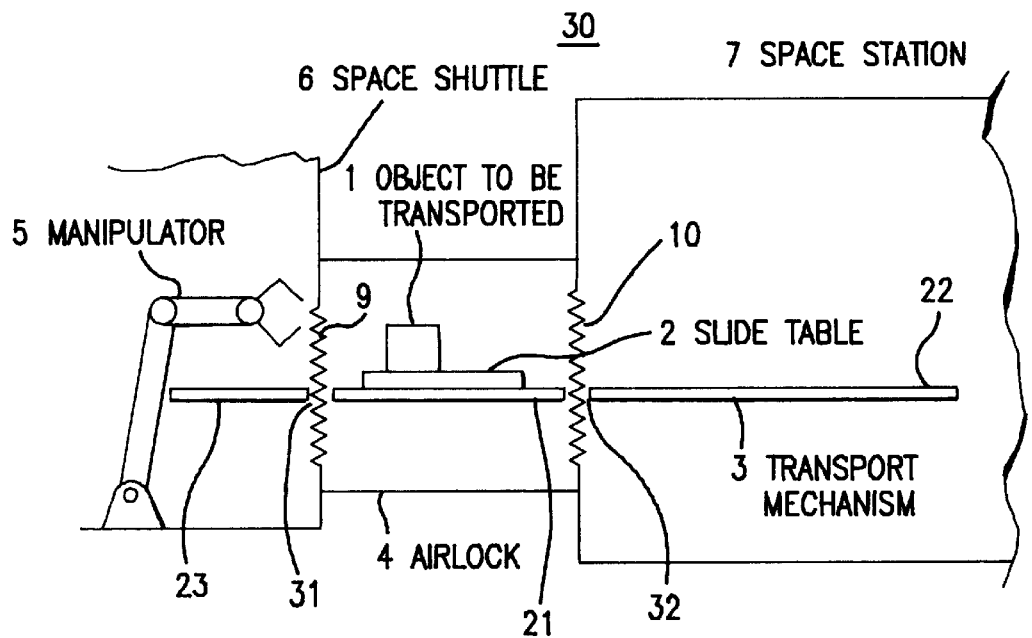
FIGS. 1(A), 1(B) and 1(C) are drawings presented to illustrate one embodiment of an object-transporting apparatus of the present invention.
Figure 1B:
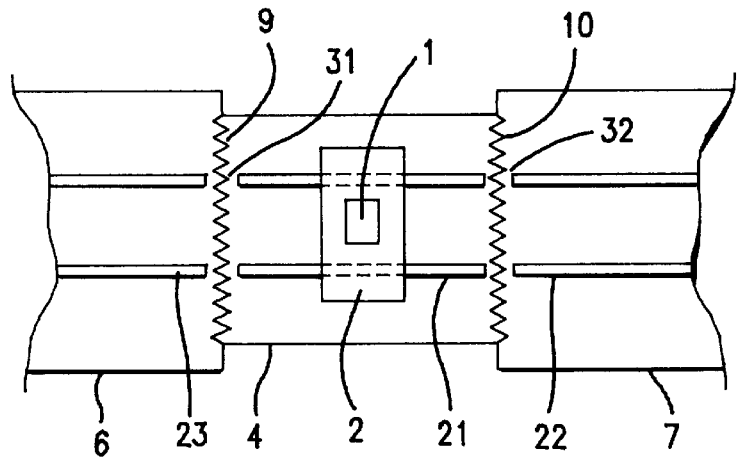
Figure 1C:
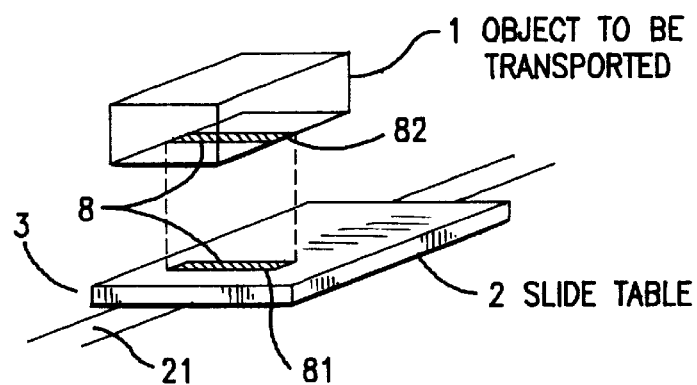
Figure 2:
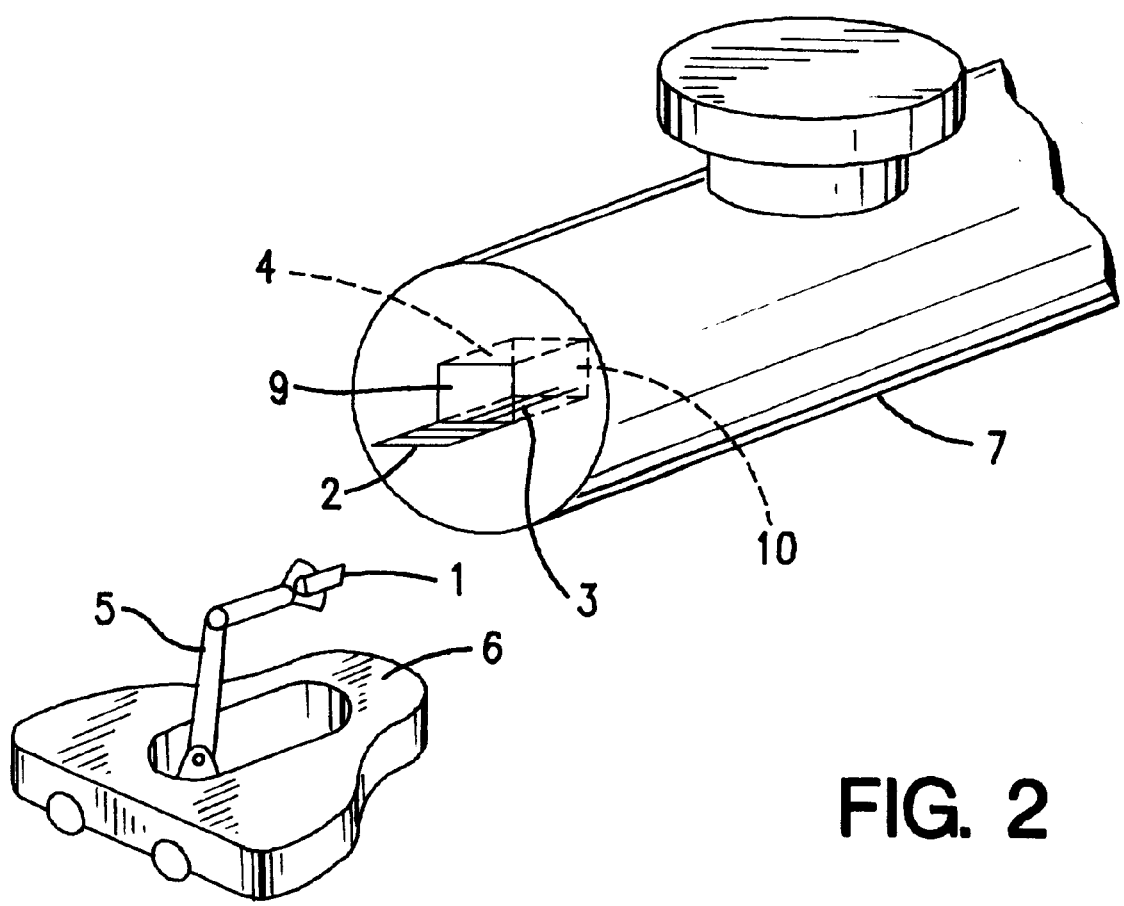
FIG. 2 is a drawing which shows the condition of a space vehicle approaching a space station.
Figure 3:
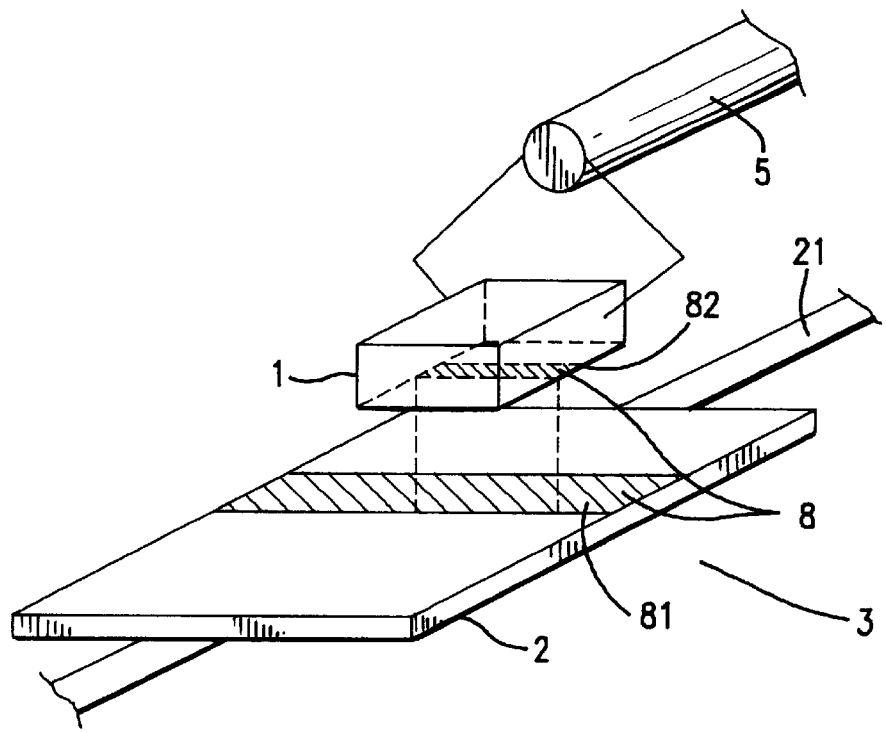
FIG. 3 is a drawing which shows the manner in which an object is placed on a slide table in the present invention.

FIG. 1 and FIG. 2 show how objects are brought from a space shuttle 6 into a space station 7. Examples of this are the passing of materials between a JEM (Japanese Experimental Module) mounted to a space station, and a HOPE, which is a space shuttle for the purpose of supplying those materials.

FIG. 1(A) to 1(C) show one typical embodiment of the object-transporting apparatus of the present invention in that the object-transporting apparatus 30 for transporting an object 1 in a zero-gravity environment, by a transport mechanism 3 is characterized in that a first joining element 81 is mounted on at least a portion of the transport mechanism 3, while a second joining element 82, being capable of coupling with the first joining element 81, is mounted on at least a portion of the object 1 to be transported, so that the object 1 can be transported by coupling the first and second joining elements 81, 82 so that the elements mate together.

In the present invention, the transport mechanism per se is not restricted to a specific type of the transport mechanism but can be used in conjunction with any kind of transport mechanism including a conveyor belt, a conveyor belt with a table fixedly mounted on the conveyor belt, a slide table moving along solid guide rails or a like means which moves and can carry an object to be transported.

FIGS. 1(A) to 1(C) show one embodiment of the present invention wherein solid rails 21 to 23 and a slide table 2 slidably move along the rails 21 to 23 with a suitable driving means (not shown).

Figure 4:
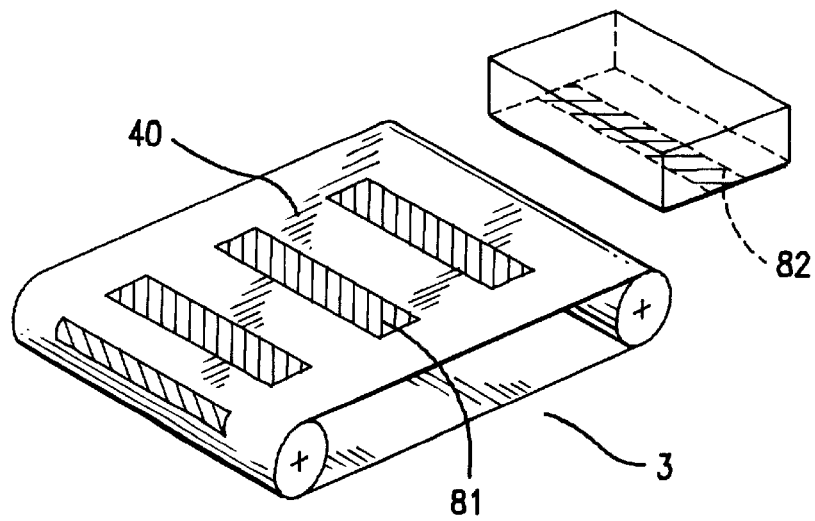
FIG. 4 shows another embodiment of the transporting mechanism of the present invention.

On the other hand, FIG. 4 shows another embodiment of the transport mechanism 3 of the present invention in that a conveyer belt 40 is used as the transport mechanism 3.

In the embodiment of the object-transporting apparatus 30 of the present invention as shown in FIGS. 1(A) to 1(C), the transport mechanism 3 includes a slide table 2 which can be moved with a suitable driving means (not shown) and the first joining element 81 is mounted at least on a portion of the slide table 2.

In the embodiment shown in FIG. 1(C), although only one first joining element 81 is provided on a part of the surface of the slide table 2, it can be provided on an overall surface of the slide table 2.

On the other hand, regarding the second joining element, it can also be provided on an overall back-side surface of the transported object and opposite to the surface of the slide table 2 on which the object is to be mounted.

As shown in FIGS. 1(B) and 1(C), the transport mechanism 3 comprises a slide table 2 and a rail 21 or plural rails 21 to 23.

In the present invention, the slide table 2 can be slidably moved along a suitable guide rail 21 or the like.

In the present invention, the transport mechanism 3 may be provided inside at least one of a space station 7, a space shuttle 6 and an airlock section 4 connected to either one of the space station 7 and the space shuttle 6.

Note that in the present invention, the transport mechanism 3 as used in the object-transporting apparatus 30 may be provided only inside the space station 7 as the most simple case in that the object 1 can only be transported inside the space station 7, while in another embodiment, the transport mechanism 3, may be provided both inside the space station 7 and the airlock section 4, so that the object 1 can be moved from the airlock section 4 to the space station 7 or vise versa.

Further, in the present invention, the transport mechanism 3 may be provided inside the space station 7, the airlock section 4 and the space shuttle 6, respectively, so that the object 1 can be moved from the space shuttle 6 to the space station 7 through the airlock section 4 or vise versa.

FIGS. 1(A) and 1(B) show the third embodiment of the present invention in that a pair of rails 23, a pair of rails 21 and a pair of rails 22 are provided in the space shuttle 6, the airlock section 4 and the space station 7, respectively and one slide table 2 is configurated so as to slidably move along these rails by a suitable driving means (not shown).

Note that in this embodiment, since there must exist a hermetically sealing door 9 between the space shuttle 6 and the airlock section 4 and also there must exist another hermetically sealing door 10 between the airlock section 4 and space station 7, each pair of rails 21 to 23 should be closely arranged to each other with interposing a suitable gap 31 or 32 therebetween.

In the present invention, the joining element is also not restricted to a specifically designed element but any kind of coupling means comprising at least two separated individual elements such as a pair which can be easily coupled to each other.

For example, a first and second joining elements 81, 82, form a flexible pressure sensitive coupling tape made of any one of a suitable textile material including synthetic filaments.

Note that such joining elements enable mutual joining and disjoining as desired, this having, for example, a hook part and a pile part or loop part, such as a popular coupling means under the name of "Magic Tape", "Velcro tape", and "Velcro fastener" (all of which are Registered Trademarks)

In the present invention, the first joining element 81 is mounted on a surface of the transport mechanism 3, onto which the object 1 is rested, while the second joining element 82 is mounted on a surface of the object 1 to be transported and which rests onto the transport mechanism 3.

As a more specific embodiment of the present invention, the first joining element 81 is mounted on a surface of the slide table 2 onto which the object 1 is rested and the second joining element 82 is mounted on a surface of the object 1 to be transported which rests onto the slide table 2.

As shown in FIG. 2, another embodiment of the present invention is illustrated.

In that, a space shuttle 6 which has transported a replenishment/exchange unit 1, which is the object to be transported from earth, approaches a space station 7, and using a manipulator 5 rests the replenishment/exchange unit 1 on a slide table 2 which is provided in an airlock 4 connected to or built in the space station 7.

In doing this, because the replenishment/exchange unit 1 is carried into a pressurized space of the space station 7, the front door of airlock 4 is first opened to allow the replenishment/exchange unit 1 to be placed on the slide table 2.

This operation can be performed not only by the manipulator 5, but also by activity outside the space station.

The replenishment/exchange unit 1 which rests on the slide table 2 is held on the slide table 2 by means of a joining element as mentioned above, the space station crew moves the slide table 2 into the airlock 4 using a transport mechanism 3, which employs, for example, either a conveyor belt or the tension in a rod.

Then, the front door 9 of the airlock 4 is closed and the airlock is hermetically sealed. Next, the pressure within the airlock is increased to the same pressure as within the space station 7, the rear door 10 of the airlock 4 is opened, and the transport mechanism 3 is used to transport the replenishment/exchange unit 1 along with the slide table 2 into the pressurized space.

After the above-noted operations, the crew removes the replenishment/exchange unit 1 from the slide table 2 and exchanges it with an old unit in the required location.

In carrying in the above-noted replenishment/exchange unit 1, when placing and holding it on the slide table 2 in an environment subjected to not only to zero gravity, but also without an atmosphere and with severe variations in temperature, the replenishment/exchange unit 1 and the slide table 2 are held mutually together by means of a joining element 8 (for example, a "Velcro" (trademark) fastener)

which is mounted on both the surface of the replenishment/exchange unit 1 that makes contact with the slide table 2 and the surface of the slide table 2 which makes contact with the unit 1.

The joining element 8 is capable of holding the replenishment/exchange unit 1 in place on the slide table 2, even at zero gravity and with no pressure applied, by means of the force of friction therebetween.

This joining element is lightweight and non-bulky, and soft and has a cushion effect as well. Further, no electric noise or non-useful gas is generated therefrom Further, an object can be mounted by a single action to the slide table 2 and to replenishment unit 1.

By holding an object to be transported in place on a slide table as described above, it is possible to transport with high reliability and flexibility, even non-standard objects, by merely joining the mating joining elements. The present invention avoids to use of a latch handle or air pressure as in the past, with reduced bulk and without the need for electrical power.

As apparent form the above embodiments, a method of the present invention for transporting an object in a zero-gravity environment, comprises the steps of: providing a first joining element on at least a portion of a transport mechanism; providing a second joining element, being capable of coupling with the first joining element, on at least a portion of the object to be transported; coupling the first and second joining elements to mate the elements together, so that the object to be transported is fixedly mounted on the transporting mechanism; and moving the transport mechanism by a suitable driving means.

What is claimed is:

1. An object-transporting system for transporting an object in a zero-gravity environment, comprising:
    a first non-electrical joining element fixedly attached to an object to be transported; and
    a second non-electrical joining element fixedly attached to a transportation means, wherein said first non-electrical joining element and said second non-electrical joining element may be mated together under pressure so that said transportation means engages said first non-electrical joining element to allow said transportation means to transport the object, wherein said transportation means comprises a slide table with driving means.

2. The object-transporting system of claim 1, wherein said slide table is adapted to slidably move along a guide rail.

3. An object-transporting system for transporting an object in a zero-gravity environment, comprising:
    a first non-electrical joining element fixedly attached to an object to be transported; and
    a second non-electrical joining element fixedly attached to a transportation means, wherein said first non-electrical joining element and said second non-electrical joining element may be mated together under pressure so that said transportation means engages said first non-electrical joining element to allow said transportation means to transport the object, wherein said transportation means comprises a first portion located within an interior of a space station, a second portion located within a space shuttle, and a third portion located in an air lock section of the space station, wherein said first, second, and third portions communicate with each other to provide a continuous transportation path between said space station interior and said space shuttle.

4. The object-transporting system of claim 3, wherein said first, second and third portions remain free of contact with one another.

5. An object-transporting system for transporting an object in a zero-gravity environment, comprising:
    a first non-electrical joining element fixedly attached to an object to be transported; and
    a second non-electrical joining element fixedly attached to a transportation means, wherein said first non-electrical joining element and said second non-electrical joining element may be mated together under pressure so that said transportation means engages said first non-electrical joining element to allow said transportation means to transport the object, wherein said second non-electrical joining element is mounted to a surface of a slide table so that said second non-electrical joining element contacts said first non-electrical joining element when the object to be transported rests on said surface.

6. The object-transporting system of claim 5, wherein said first and second non-electrical joining elements comprise flexible pressure-sensitive coupling tape.

* * * * *